(12) United States Patent
Yuki et al.

(10) Patent No.: US 11,874,527 B2
(45) Date of Patent: Jan. 16, 2024

(54) REDUCTION OPTICAL SYSTEM AND IMAGE PICKUP APPARATUS

(71) Applicant: CANON KABUSHIKI KAISHA, Tokyo (JP)

(72) Inventors: Akihiko Yuki, Tochigi (JP); Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 345 days.

(21) Appl. No.: 17/223,528

(22) Filed: Apr. 6, 2021

(65) Prior Publication Data
US 2021/0318517 A1   Oct. 14, 2021

(30) Foreign Application Priority Data

Apr. 13, 2020   (JP) .................. 2020-071689

(51) Int. Cl.
*G02B 9/60*   (2006.01)
(52) U.S. Cl.
CPC ...................... *G02B 9/60* (2013.01)

(58) Field of Classification Search
CPC ............. G02B 9/60; G02B 9/64; G02B 13/00
See application file for complete search history.

(56) References Cited

U.S. PATENT DOCUMENTS 8,903,232 B1   12/2014 Caldwell

FOREIGN PATENT DOCUMENTS

| JP | 2018189864 A | 11/2018 |
|---|---|---|
| JP | 2019003074 A | 1/2019 |

*Primary Examiner* — Jack Dinh
(74) *Attorney, Agent, or Firm* — CANON U.S.A., INC. IP Division

(57) ABSTRACT

A reduction optical system (Gr) disposed on an image side of a main optical system is configured such that a composite focal length of the main optical system and the reduction optical system is shorter than a focal length of the main optical system. The reduction optical system has a positive refractive power, and includes a plurality of positive lenses and a plurality of negative lenses. The reduction optical system satisfies inequalities with respect to a lateral magnification of the reduction optical system disposed on the image side of the main optical system, a focal length of the reduction optical system, a focal length of a positive lens Gp1 included in the plurality of positive lenses, and a refractive index of the positive lens Gp1.

18 Claims, 17 Drawing Sheets

REDUCTION OPTICAL SYSTEM AND IMAGE PICKUP APPARATUS

BACKGROUND OF THE DISCLOSURE

Field of the Disclosure

The aspect of the embodiments relates to a reduction optical system and an image pickup apparatus.

Description of the Related Art

Both U.S. Pat. No. 8,903,232 and Japanese Patent Application Laid-Open No. 2018-189864 discuss a reduction optical system disposed on the image side of a main optical system (an interchangeable lens) for, for example, a camera for broadcasting, a camera for movies, a camera for video images, or a camera for still images, and configured in such a manner that a composite focal length of the main optical system and the reduction optical system is shorter than a focal length of the main optical system. This reduction optical system can keep the angle of view unchanged when being mounted on a camera having an image size smaller as much as the magnification thereof than the image size that the main optical system is assumed to work for. Further, this reduction optical system can acquire an F-number brighter (smaller) as much as the magnification thereof than the F-number of the main optical system.

The reduction optical system discussed in U.S. Pat. No. 8,903,232 is insufficient regarding corrections of various aberrations, especially, a field curvature and an astigmatism. On the other hand, the reduction optical system discussed in Japanese Patent Application Laid-Open No. 2018-189864 is insufficient regarding the reduction ratio thereof, and an attempt to further reduce the reduction ratio can lead to insufficiency of corrections of aberrations, especially a field curvature and an astigmatism.

SUMMARY OF THE DISCLOSURE

An aspect of embodiments provides a reduction optical system disposed on an image side of a main optical system. A composite focal length of the main optical system and the reduction optical system is shorter than a focal length of the main optical system. The reduction optical system has a positive refractive power, and includes a plurality of positive lenses and a plurality of negative lenses. The following inequalities are satisfied:

$0.50<\beta<0.78$, $0.20<fp1/f<1.30$, and $1.895<Np1<2.150$, where $\beta$ is a lateral magnification of the reduction optical system disposed on the image side of the main optical system, f is a focal length of the reduction optical system, fp1 is a focal length of a positive lens Gp1 included in the plurality of positive lenses, and Np1 is a refractive index of the positive lens Gp1.

Further features of the disclosure will become apparent from the following description of exemplary embodiments with reference to the attached drawings.

DESCRIPTION OF THE EMBODIMENTS

Figure 1:
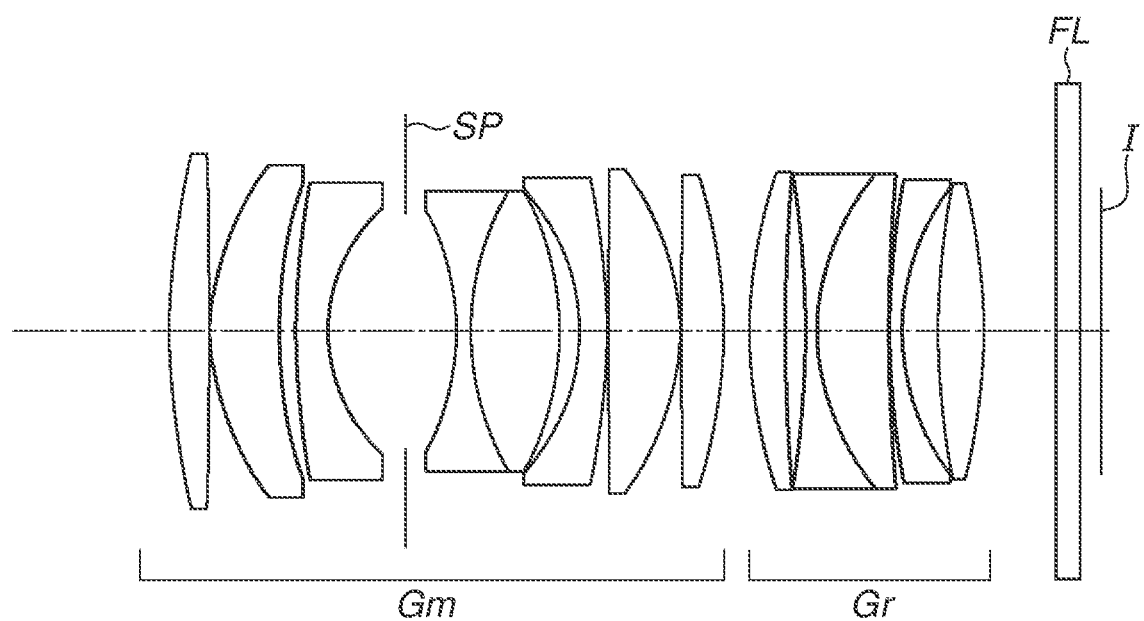
FIG. 1 is a cross-sectional view of an optical system constructed by mounting a reduction optical system according to an example 1 on a main optical system focused on infinity.

In the following description, an exemplary embodiment of the disclosure will be described with reference to the attached drawings. In principle (unless otherwise indicated), for example, like members will be identified by like reference numerals and redundant descriptions thereof will be omitted throughout all the drawings for illustrating the exemplary embodiment.

A reduction optical system (a rear wide converter) according to the present exemplary embodiment will be described. This reduction optical system is disposed on the image side of a main optical system (an interchangeable lens), and is configured in such a manner that a composite focal length of the main optical system and the reduction optical system is shorter than the focal length of the main optical system. The reduction optical system has a positive refractive power, and includes a plurality of positive lenses and a plurality of negative lenses. Assume that $\beta$ is the lateral magnification of the reduction optical system disposed on the image side of the main optical system, f is the focal length of the reduction optical system, fp1 is the focal length of a positive lens Gp1 included in this plurality of positive lenses, and Np1 is the refractive index of the positive lens Gp1. In this case, this reduction optical system satisfies the following inequalities. It should be noted that an 'inequality' can be referred to as a 'conditional expression'.

$$0.50 < \beta < 0.78 \quad (1)$$

$$0.20 < fp1/f < 1.30 \quad (2)$$

$$1.895 < Np1 < 2.150 \quad (3)$$

In this manner, the reduction optical system according to the present exemplary embodiment includes the plurality of positive lenses and the plurality of negative lenses, defines R (a reduction ratio) as described above, includes the positive lens Gp1 in this plurality of positive lenses, and defines the focal length of this positive lens Gp1 and the refractive index of the material thereof. Due to this definition, the present exemplary embodiment can provide a reduction optical system advantageous in terms of the high optical performance (for example, a performance regarding a field curvature and an astigmatism) while achieving a sufficient reduction ratio.

More specifically, the inequality (1) defines the ratio of the composite focal length of the main optical system and the reduction optical system to the focal length of the main optical system (also referred to as the magnification or the reduction ratio of the reduction optical system). Then, the value of the lateral magnification R of the reduction optical system can be calculated by the following calculation.

β=(the composite focal length of the main optical system and the reduction optical system)/(the focal length of the main optical system)

For example, in an example 1 that will be described below, the focal length (the composite focal length) of an optical system constructed by disposing the reduction optical system in the main optical system is 36.54 mm, and the focal length of the main optical system alone is 51.46 mm. Therefore, the lateral magnification R of the reduction optical system is calculated to be 36.54/51.46=0.71 (times).

Failing to satisfy the inequality (1) regarding the upper limit value results in insufficiency of the effect of reducing the image size and the F-number using the reduction optical system. Failing to satisfy the inequality (1) regarding the lower limit value leads to an excessive increase in the positive refractive power of the reduction optical system (as a whole), thereby making the optical system disadvantageous in terms of the optical performance (for example, a spherical aberration, a field curvature, and an astigmatism) of the reduction optical system.

In one embodiment, the reduction optical system further satisfies the following inequality.

$$0.60 < \beta < 0.78 \quad (1a)$$

Further, the reduction optical system further satisfies the following inequality.

$$0.65 < \beta < 0.78 \quad (1b)$$

The inequalities (2) and (3) define the focal length and the refractive index of the positive lens Gp1, respectively. Satisfying the inequalities (2) and (3) can achieve both a strong positive refractive power and a high optical performance (for example, corrections of a field curvature and an astigmatism) of the reduction optical system.

Failing to satisfy the inequality (2) regarding the upper limit value leads to a reduction in the positive refractive power of the positive lens Gp1 and thus an excessive reduction in the positive refractive power of the reduction optical system, thereby resulting in insufficiency of the effect of reducing the image size and the F-number. Failing to satisfy the inequality (2) regarding the lower limit value leads to an excessive increase in the positive refractive power of the positive lens Gp1, thereby making the optical system disadvantageous in terms of the high optical performance (for example, corrections of a field curvature and an astigmatism).

Failing to satisfy the inequality (3) regarding the upper limit value leads to an excessive increase in dispersion of the positive lens Gp1 with existing glass materials, thereby resulting in insufficiency of a correction of an axial chromatic aberration occurring on the positive lens Gp1. Failing to satisfy the inequality (3) regarding the lower limit value leads to an excessive reduction in the refractive index of the positive lens Gp1, thereby making the optical system disadvantageous in terms of the high optical performance (for example, corrections of a field curvature and an astigmatism).

In one embodiment, the reduction optical system further satisfies the following inequalities.

$$0.23 < fp1/f < 1.25 \quad (2a)$$

$$1.900 < Np1 < 2.100 \quad (3a)$$

Further, the reduction optical system further satisfies the following inequalities.

$$0.24 < fp1/f < 1.25 \quad (2b)$$

$$1.900 < Np1 < 2.000 \quad (3b)$$

Further, the reduction optical system according to the present exemplary embodiment satisfies the following inequality, assuming that the plurality of negative lens includes a negative lens Gn1 and vn1 is the Abbe number of the negative lens Gn1.

$$15.00 < vn1 < 23.00 \quad (4)$$

Satisfying the inequality (4) can provide a reduction optical system advantageous in terms of the high optical performance (a correction of a chromatic aberration of magnification).

Failing to satisfy the inequality (4) regarding the upper limit value leads to an excessive increase in a partial dispersion ratio regarding the g-line with existing glass materials, thereby resulting in insufficiency of a correction of a secondary spectrum of a chromatic aberration of magnification regarding the g-line. Failing to satisfy the inequality (4) regarding the lower limit value leads to an excessive increase in dispersion, and leads to an excessive increase in the refractive power of the negative lens Gn1 to thus result in insufficiency of a correction of an astigmatism when the negative lens Gn1 is used for a primary correction of a chromatic aberration of magnification.

Further, the reduction optical system according to the present exemplary embodiment includes a negative lens Gn2 different from the negative lens Gn1 in the plurality of negative lenses, and satisfies the following inequalities assuming that fn2 and Nn2 are the focal length and the refractive index of the negative lens Gn2, respectively.

$$0.30 < |fn2/f| < 1.00 \quad (5)$$

$$1.450 < Nn2 < 1.700 \quad (6)$$

Satisfying the inequality (5) can cancel out a positive component in the Petzval sum due to the positive lens Gp1, thereby providing a reduction optical system advantageous in terms of the high optical performance (a correction of a field curvature).

Failing to satisfy the inequality (5) regarding the upper limit value leads to an excessive reduction in the refractive power of the negative lens Gn2 and a reduction in the effect of reducing the Petzval sum, thereby making the optical system disadvantageous in terms of corrections of a field curvature and an astigmatism. Failing to satisfy the inequality (5) regarding the lower limit value leads to an excessive increase in the refractive power of the negative lens Gn2, thereby making the optical system disadvantageous in terms of a correction of a spherical aberration occurring in an overcorrection direction due to the negative lens Gn2.

Failing to satisfy the inequality (6) regarding the upper limit value leads to an excessive increase in the refractive power of the negative lens Gn2 and a reduction in the effect of reducing the Petzval sum, thereby making the optical system disadvantageous in terms of corrections of a field curvature and an astigmatism. Failing to satisfy the inequality (6) regarding the lower limit value leads to an excessive reduction in the refractive index of the negative lens Gn2, and causes an attempt to acquire the refractive power of the negative lens Gn2 satisfying the inequality (5) to lead to an excessive increase in the curvature of the negative lens Gn2, thereby making the optical system disadvantageous in terms of a correction of a spherical aberration occurring in an overcorrection direction.

Further, the reduction optical system according to the present exemplary embodiment includes a positive lens Gp2 different from the positive lens Gp1 in the plurality of positive lenses, and satisfies the following inequalities assuming that fp2 and vp2 are the focal length and the Abbe number of the positive lens Gp2, respectively.

$$0.30 < fp2/f < 0.80 \quad (7)$$

$$40.00 < vp2 < 60.00 \quad (8)$$

Satisfying the inequalities (7) and (8) in addition to the inequalities (2) and (3) allows the positive lens Gp1 and the positive lens Gp2 to share the positive refractive power of the reduction optical system therebetween, thereby being able to provide a reduction optical system advantageous in terms of the high optical performance (a correction of an axial chromatic aberration).

Failing to satisfy the inequality (7) regarding the upper limit value leads to an excessive reduction in the share of the positive refractive power assigned to the positive lens Gp2, thereby resulting in insufficiency of a correction of an axial chromatic aberration. Failing to satisfy the inequality (7) regarding the lower limit value leads to an excessive increase in the share of the positive refractive power assigned to the positive lens Gp2, thereby resulting in insufficiency of corrections of a spherical aberration and an astigmatism occurring on the positive lens Gp2.

Failing to satisfy the inequality (8) regarding the upper limit value leads to an excessive reduction in the refractive index with existing glass materials, thereby resulting in insufficiency of corrections of a spherical aberration and an astigmatism occurring on the positive lens Gp2. Failing to satisfy the inequality (8) regarding the lower limit value leads to an excessive increase in the dispersion of the positive lens Gp2, thereby resulting in insufficiency of a correction of an axial chromatic aberration.

Further, the reduction optical system according to the present exemplary embodiment satisfies the following inequality, assuming that fpave is the average focal length of the plurality of positive lenses.

$$0.35 < fpave/f < 1.00 \quad (9)$$

Failing to satisfy the inequality (9) regarding the upper limit value leads to an excessive reduction in the positive refractive power of the reduction optical system, thereby resulting in insufficiency of the effect of reducing the image size and the F-number using the reduction optical system. Failing to satisfy the inequality (9) regarding the lower limit value results in an excessive increase in the refractive index per lens of the plurality of positive lenses, thereby making the optical system disadvantageous in terms of corrections of a field curvature and an astigmatism.

Further, the reduction optical system according to the present exemplary embodiment satisfies the following inequality, assuming that Npave is the average refractive index of the plurality of positive lenses.

$$1.800 < Npave < 2.000 \quad (10)$$

Failing to satisfy the inequality (10) regarding the upper limit value results in an excessive increase in dispersion per lens of the plurality of positive lenses with existing glass materials, thereby leading to insufficiency of a correction of an axial chromatic aberration occurring on this plurality of positive lenses. Failing to satisfy the inequality (10) regarding the lower limit value results in an excessive reduction in the refractive index of this plurality of positive lenses, thereby leading to insufficiency of corrections of a field curvature and an astigmatism occurring on this plurality of positive lenses.

Figure 17:
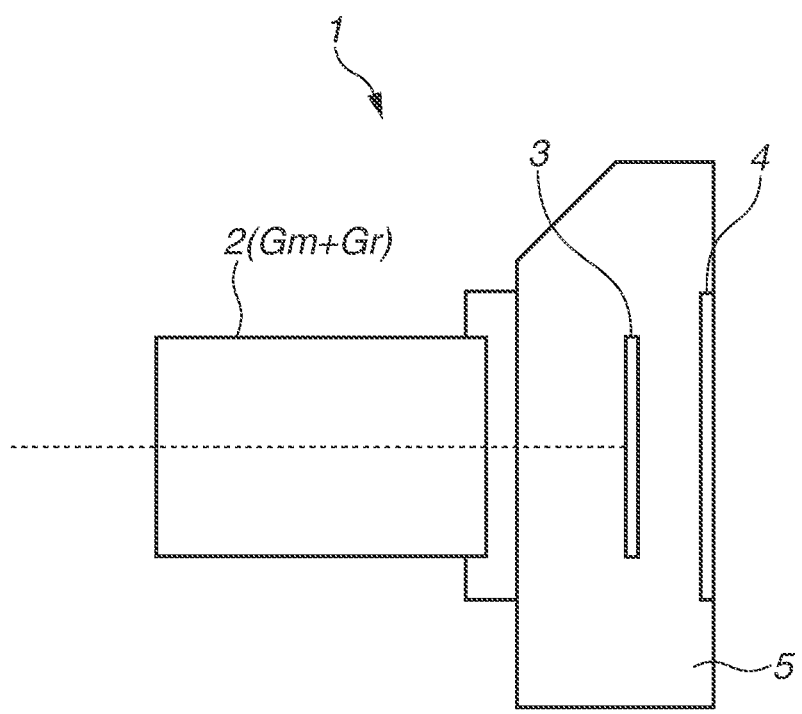
FIG. 17 illustrates an example of the configuration of an image pickup apparatus.

Further, according to the present exemplary embodiment, it is possible to construct an image pickup apparatus including the reduction optical system defined in the above-described manner and an image pickup element that picks up an image formed via this reduction optical system. Further, it is possible to construct an image pickup apparatus including an image pickup apparatus main body including the reduction optical system defined in the above-described manner. Therefore, according to the present exemplary embodiment, it is possible to realize an image pickup apparatus benefiting from the advantages of the above-described reduction optical system. Now, an example of a configuration of an image pickup apparatus including a reduction optical system Gr according to the present exemplary embodiment will be described. FIG. 17 illustrates an example of a configuration of an image pickup apparatus. In FIG. 17, an image pickup apparatus 1 can be, for example, a so-called interchangeable-lens image pickup apparatus equipped with an optical system 2 including a main optical system Gm and the reduction optical system Gr. This image pickup apparatus 1 can be a so-called mirrorless camera. The optical system 2 is formed by mounting the reduction optical system Gr on the image side of the main optical system Gm. In the image pickup apparatus 1, the optical system 2 forms an image (a subject image) on an image plane, where an image pickup element 3 is disposed, in an image pickup apparatus main body 5 via a non-illustrated optical low-pass filter with light from a non-illustrated object (a subject). The image pickup element 3 picks up (photoelectrically converts) this image, thereby generating image data. This image data is displayed on a display unit 4 (an image display unit, such as an electronic viewfinder) included in the image pickup apparatus 1 (the image pickup apparatus main body 5). A user of the image pickup apparatus 1 can observe the subject via the display unit 4. When an image pickup start member (for example, a release button) is operated by the user, the image data acquired via the image pickup element 3 is, for example, stored into a storage unit (a memory) in the image pickup apparatus main body 5. In this manner, the user can image the subject using the image pickup apparatus 1. According to the present exemplary embodiment, it is possible to provide the image pickup apparatus 1 including the reduction optical system Gr advantageous in terms of the high optical performance. The image pickup apparatus 1 according to the present exemplary embodiment can be a single-lens reflex camera including a quick-return mirror in the image pickup apparatus main body 5 and allowing the subject image to be observed via a finder optical system without being limited to the so-called mirrorless camera. Further, the image pickup apparatus 1 according to the present exemplary embodiment can be a camera for video images, a camera for movies, or a camera for broadcasting. According to the present exemplary embodiment, it is possible to provide an image pickup apparatus benefiting from the advantages of the above-described reduction optical system.

In the following description, an example 1 (a numerical example 1) to an example 8 (a numerical example 8) according to the present exemplar embodiment will be described. Now, the details of numerical values according to each of the numerical examples 1 to 8 will be described. In each of the numerical examples 1 to 8, assume that r is a curvature radius of each surface, d is each surface interval, nd or Nd is an absolute refractive index under one atmosphere regarding the d-line among the Fraunhofer lines, and vd is an Abbe number. BF is a backfocus (an air-equivalent length). Assuming that Ng, NF, Nd, and NC are refractive indexes regarding the g-line, the F-line, the d-line, and the C-line among the Fraunhofer lines, respectively, the Abbe number vd is defined in a similar manner to the generally used definition, i.e., is expressed in the following manner.

$$vd=(Nd-1)/(NF-NC)$$

The shape of an aspherical surface is expressed, setting the X axis on the optical axis direction and the H axis on a direction perpendicular to the optical axis direction and assuming that the positive side is a direction in which the light travels. Assuming that R is a paraxial curvature radius and k is a conic constant, and A4, A6, A8, A10, and A12 are each an aspherical coefficient, the shape of an aspherical surface (a deviation amount from a reference spherical surface) is expressed by the following equation. In the examples, "e-Z" means "×10-Z".

$$X = \frac{H^2/R}{1+\sqrt{1-(1+k)(H/R)^2}} + A4H^4 + A6H^6 + A8H^8 + A10H^{10} + A12H^{12} \quad (1)$$

Example 1

FIG. 1 is a cross-sectional view of an optical system constructed by mounting a reduction optical system according to the example 1 (corresponding to the numerical example 1) on a main optical system focused on infinity. In FIG. 1, the optical system includes the main optical system Gm and the reduction optical system Gr. The main optical system Gm includes eight lenses, i.e., a lens Lm1 to a lens Lm8 arranged in this order from the object side to the image side along the optical axis. An aperture stop Sp is disposed between the lens Lm3 and the lens Lm4. The main optical system Gm is common in each of the examples 1 to 8 that will be described below. FIG. 1 also illustrates an image plane I, and a light-receiving surface of the image pickup element (a photoelectric conversion element) that captures (photoelectrically converts) the image formed via the main optical system Gm and the reduction optical system Gr, and a light-receiving surface of a film exposed to light according to this image are positioned on the image plane I. An optical member FL, such as an optical low-pass filter, is disposed between the lens surface located closest to the image side in the reduction optical system Gr and the image plane I.

Figure 2:
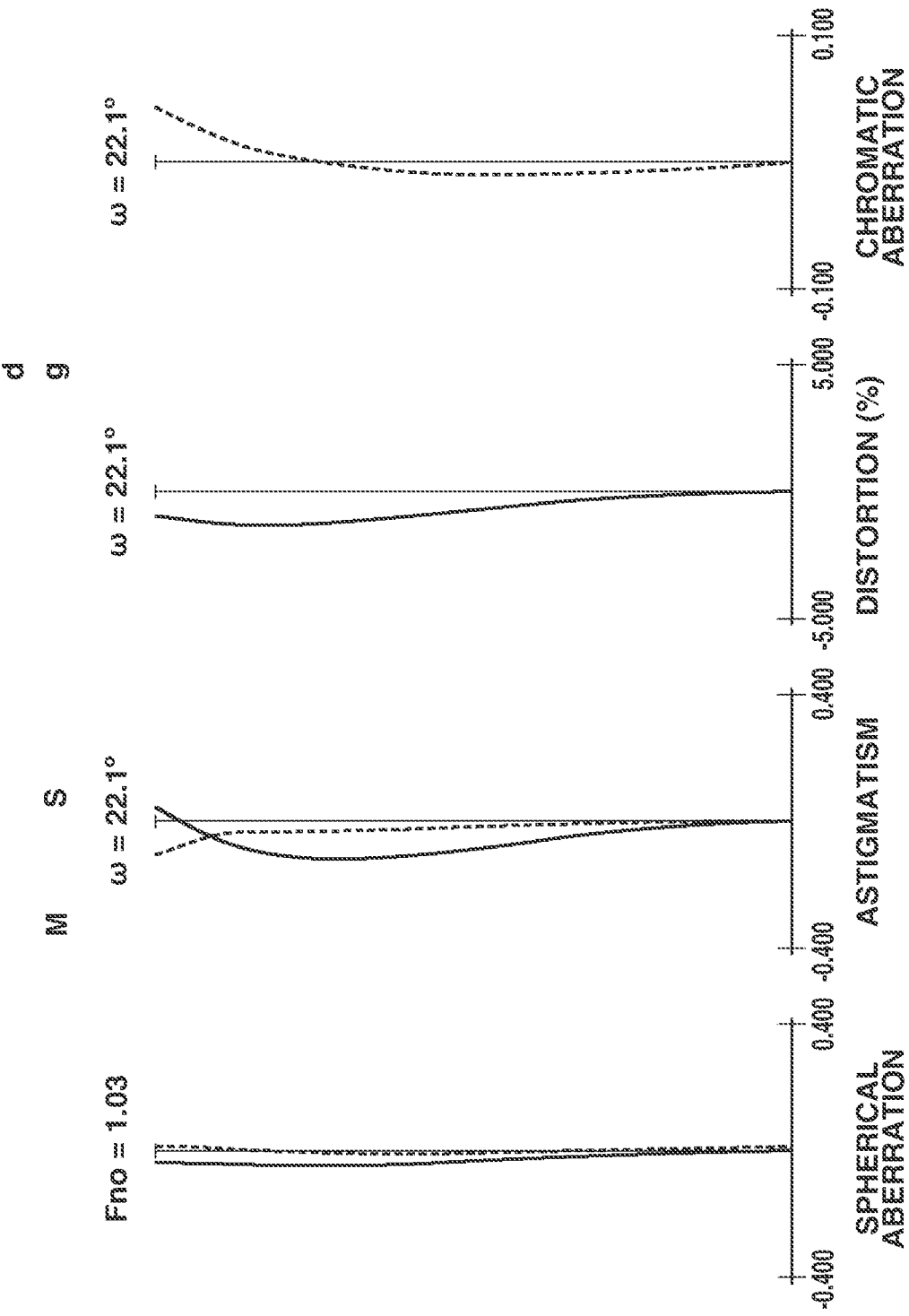
FIG. 2 illustrates longitudinal aberrations of the optical system illustrated in FIG. 1.

FIG. 2 illustrates longitudinal aberrations of the optical system illustrated in FIG. 1. In FIG. 2, a solid line and a broken line in a spherical aberration correspond to the d-line and the g-line, respectively. A broken line and a solid line in an astigmatism correspond to the meridional image plane and the sagittal image plane, respectively. A broken line in a chromatic aberration of magnification corresponds to the g-line. The symbols ω and Fno represent a half angle of view and an F-number, respectively. The full scale on the horizontal axis in the diagram illustrating the longitudinal aberrations is set to ±0.400 mm for the spherical aberration, ±0.400 mm for the astigmatism, ±5.000% for the distortion, and ±0.100 mm for the chromatic aberration of magnification.

The reduction optical system Gr according to the present example includes five lenses, i.e., a positive lens Gp11, a cemented lens formed by cementing the negative lens Gn2 and a positive lens Gp12 to each other, the negative lens Gn1, and the positive lens Gp2 arranged in this order from the object side to the image side along the optical axis. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in a table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 1

Unit mm

Surface Data

| Surface Number | r | d | nd | vd |
|---|---|---|---|---|
| 1 | 80.741 | 3.92 | 1.77250 | 49.6 |
| 2 | -851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | -27.317 | 1.39 | 1.73800 | 32.3 |
| 9 | 29.595 | 8.79 | 1.88100 | 40.1 |
| 10 | -31.996 | 2.12 | | |
| 11 | -21.263 | 2.52 | 1.72047 | 34.7 |
| 12 | -82.521 | 0.15 | | |
| 13 | 723.827 | 7.10 | 1.59522 | 67.7 |
| 14 | -28.930 | 0.15 | | |
| 15* | 625.332 | 4.12 | 1.77250 | 49.5 |
| 16 | -56.842 | 2.64 | | |
| 17 | 50.909 | 3.53 | 2.00100 | 29.1 |
| 18 | 206.169 | 1.96 | | |
| 19 | -106.066 | 1.20 | 1.62004 | 36.3 |
| 20 | 26.641 | 7.00 | 2.00100 | 29.1 |
| 21 | 172.336 | 0.17 | | |
| 22 | 94.213 | 1.15 | 1.94594 | 18.0 |
| 23 | 25.510 | 3.53 | | |
| 24 | 80.745 | 4.59 | 1.69680 | 55.5 |
| 25 | -63.832 | 7.08 | | |
| 26 | ∞ | 2.50 | 1.54430 | 69.9 |
| 27 | ∞ | 2.00 | | |
| Image Plane | ∞ | | | |

Aspherical Surface Data

Fifteenth Surface $K = 0.00000e+000$ $A4 = -2.77448e-006$ $A6 = -3.60131e-010$
$A8 = -1.23803e-011$ $A10 = 4.76619e-014$ $A12 = -6.88926e-017$

| | |
|---|---|
| Focal Length | 36.54 |
| F-number | 1.03 |
| Angle of View | 22.05 |
| Overall Lens Length | 91.95 |
| BF | 2.00 |

Lens Group Data

| Group | Starting Surface | Focal Length |
|---|---|---|
| Gm | 1 | 51.46 |
| Gr | 17 | 83.27 |

Example 2

Figure 3:
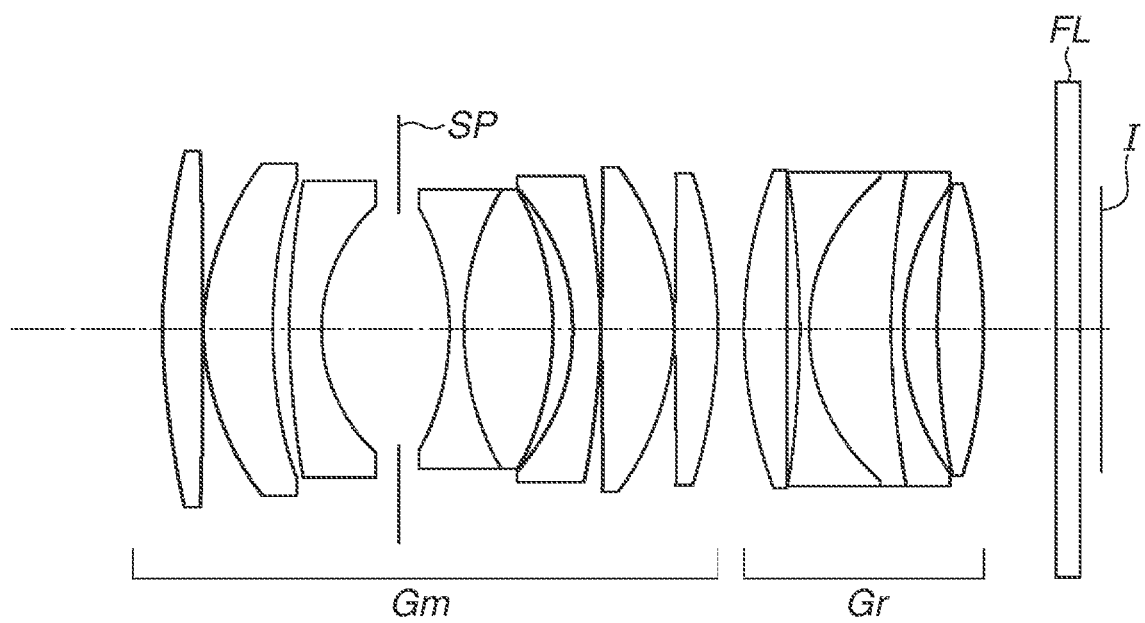
FIG. 3 is a cross-sectional view of an optical system constructed by mounting a reduction optical system according to an example 2 on the main optical system focused on infinity.
Figure 4:
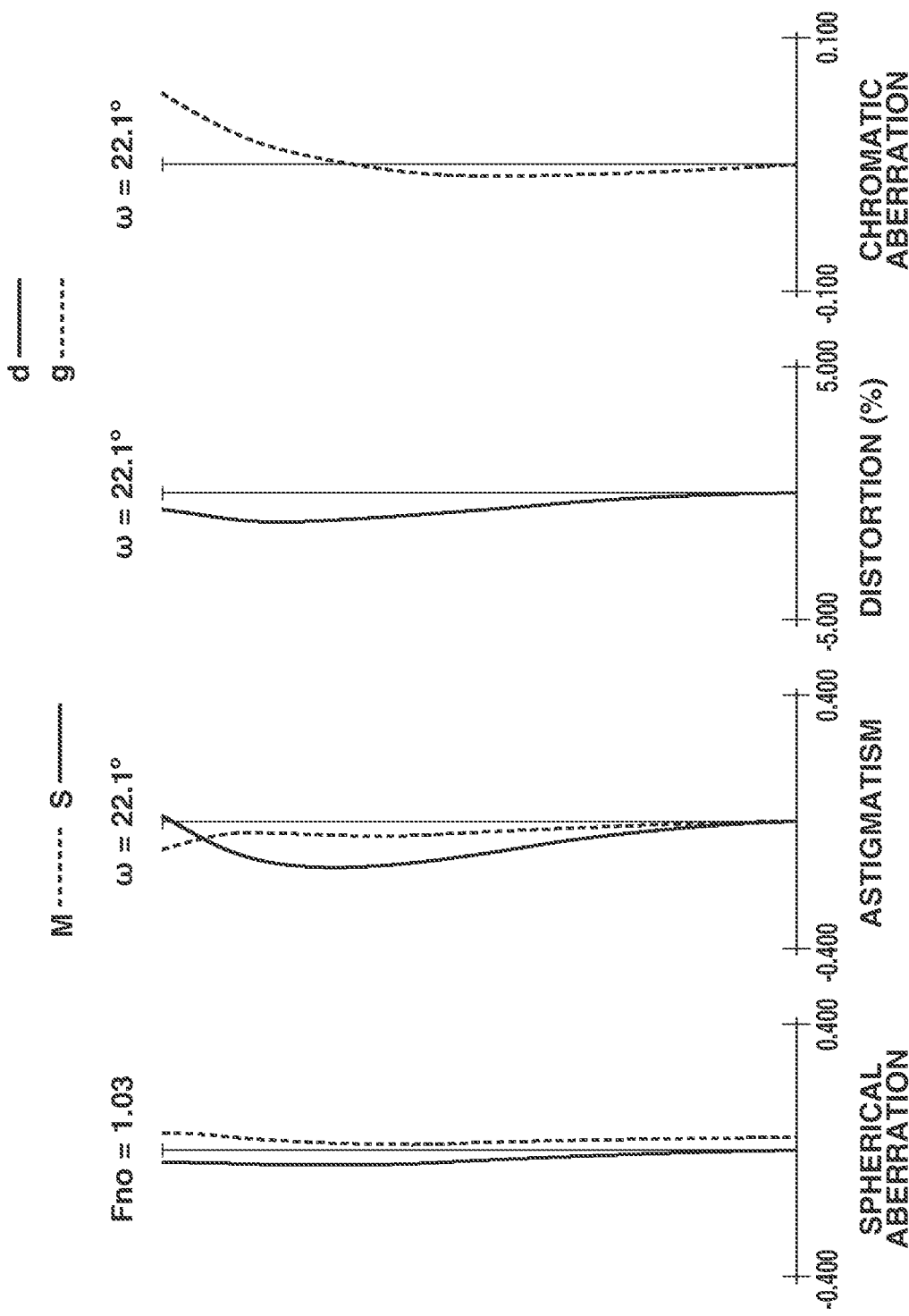
FIG. 4 illustrates longitudinal aberrations of the optical system illustrated in FIG. 3.

FIG. 3 is a cross-sectional view of an optical system constructed by mounting a reduction optical system according to the example 2 (corresponding to the numerical example 2) on the main optical system focused on infinity. FIG. 4 illustrates longitudinal aberrations of the optical system illustrated in FIG. 3. The reduction optical system Gr according to the present example includes five lenses, i.e., the positive lens Gp11, a cemented lens formed by cementing the negative lens Gn2, the positive lens Gp12, and the negative lens Gn1 to one another, and the positive lens Gp2 arranged in this order from the object side to the image side along the optical axis. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 2

Unit mm

Surface Data

| Surface Number | r | d | nd | vd |
|---|---|---|---|---|
| 1 | 80.741 | 3.92 | 1.77250 | 49.6 |
| 2 | -851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | -27.317 | 1.39 | 1.73800 | 32.3 |
| 9 | 29.595 | 8.79 | 1.88100 | 40.1 |
| 10 | -31.996 | 2.12 | | |
| 11 | -21.263 | 2.52 | 1.72047 | 34.7 |
| 12 | -82.521 | 0.15 | | |
| 13 | 723.827 | 7.10 | 1.59522 | 67.7 |
| 14 | -28.930 | 0.15 | | |
| 15* | 625.332 | 4.12 | 1.77250 | 49.5 |
| 16 | -56.842 | 2.64 | | |
| 17 | 47.832 | 4.27 | 1.95375 | 32.3 |
| 18 | 1940.867 | 1.20 | | |
| 19 | -118.503 | 1.00 | 1.74951 | 35.3 |
| 20 | 21.634 | 8.19 | 1.95375 | 32.3 |
| 21 | 100.856 | 1.00 | 1.89286 | 20.4 |
| 22 | 25.910 | 3.42 | | |
| 23 | 80.683 | 4.62 | 1.72916 | 54.7 |
| 24 | -55.811 | 7.00 | | |
| 25 | ∞ | 2.50 | 1.51633 | 64.1 |
| 26 | ∞ | 2.04 | | |
| Image Plane | ∞ | | | |

-continued

Unit mm

Aspherical Surface Data

Fifteenth Surface

K = 0.00000e+000 A4 = −2.77448e−006 A6 = −3.60131e−010
A8 = −1.23803e−011 A10 = 4.76619e−014 A12 = −6.88926e−017

| | |
|---|---|
| Focal Length | 36.54 |
| F-number | 1.03 |
| Angle of View | 22.05 |
| Image Height | 14.80 |
| Overall Lens Length | 92.47 |
| BF | 2.04 |

Lens Group Data

| Group | Starting Surface | Focal Length |
|---|---|---|
| Gm | 1 | 51.46 |
| Gr | 17 | 82.55 |

Example 3

Figure 5:
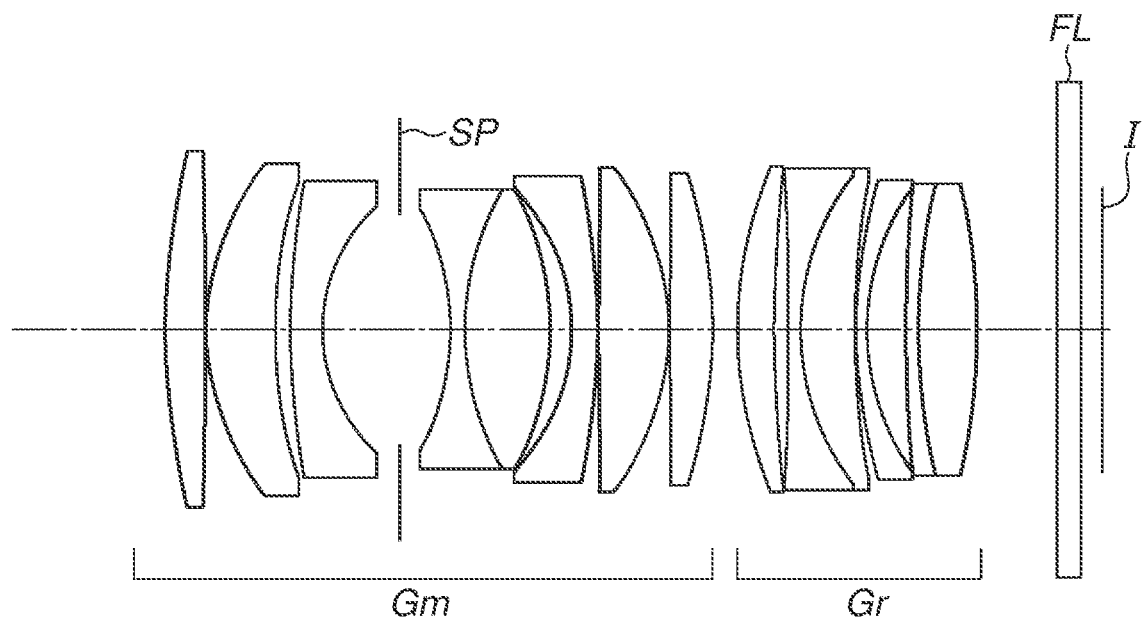
FIG. 5 is a cross-sectional view of an optical system constructed by mounting a reduction optical system according to an example 3 on the main optical system focused on infinity.
Figure 6:
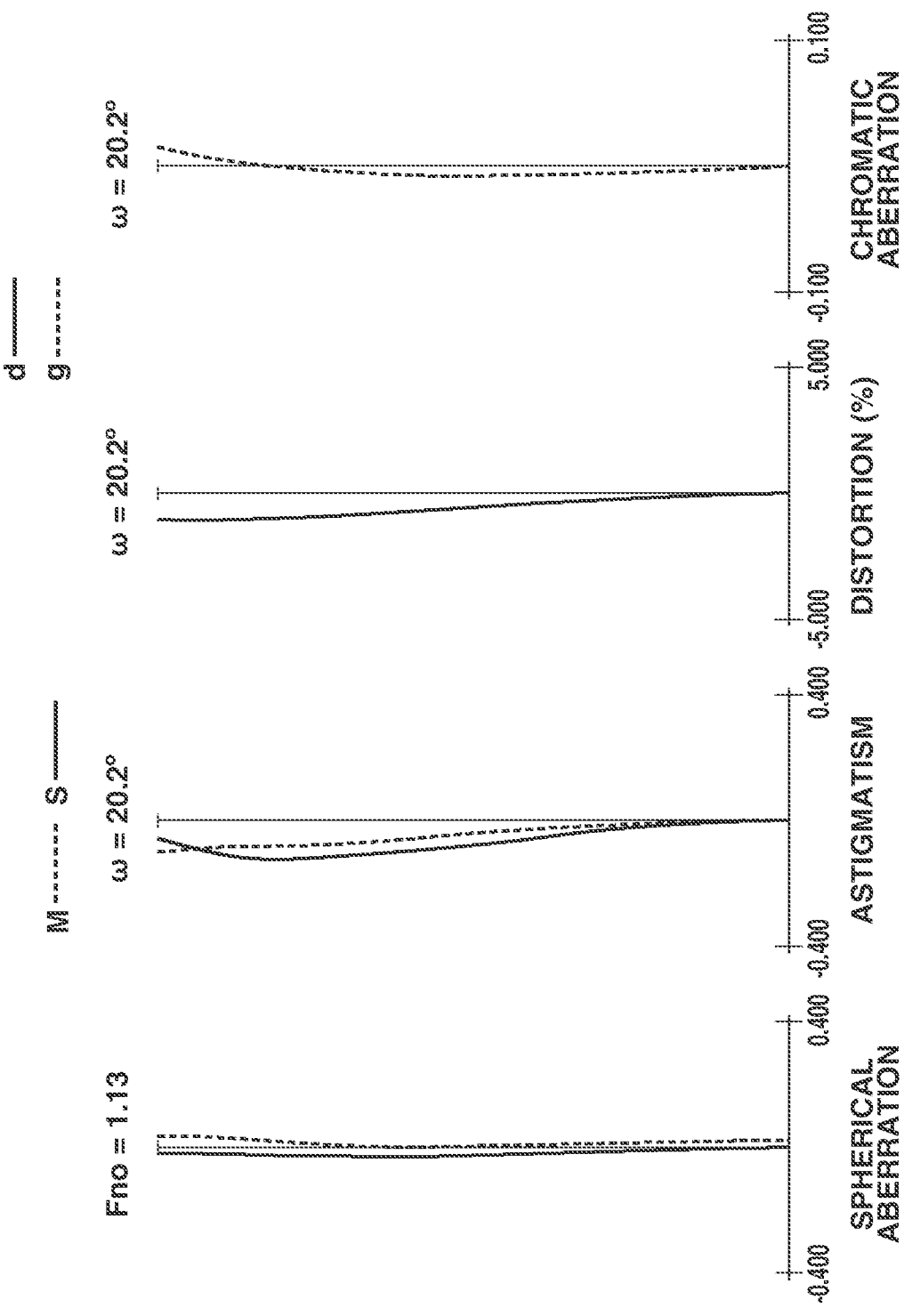
FIG. 6 illustrates longitudinal aberrations of the optical system illustrated in FIG. 5.

FIG. 5 is a cross-sectional view of an optical system constructed by mounting a reduction optical system according to the example 3 (corresponding to the numerical example 3) on the main optical system focused on infinity. FIG. 6 illustrates longitudinal aberrations of the optical system illustrated in FIG. 5.

The reduction optical system Gr according to the present example includes the following lenses arranged in the listed order from the object side to the image side along the optical axis. That is, the reduction optical system Gr includes six lenses, i.e., the positive lens Gp11, the cemented lens formed by cementing the negative lens Gn2 and the positive lens Gp12 to each other, the negative lens Gn1, and a cemented lens formed by cementing a negative lens and the positive lens Gp2 to each other. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 3

Unit mm

Surface Data

| Surface Number | r | d | nd | vd |
|---|---|---|---|---|
| 1 | 80.741 | 3.92 | 1.77250 | 49.6 |
| 2 | −851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | −27.317 | 1.39 | 1.73800 | 32.3 |
| 9 | 29.595 | 8.79 | 1.88100 | 40.1 |
| 10 | −31.996 | 2.12 | | |
| 11 | −21.263 | 2.52 | 1.72047 | 34.7 |
| 12 | −82.521 | 0.15 | | |
| 13 | 723.827 | 7.10 | 1.59522 | 67.7 |
| 14 | −28.930 | 0.15 | | |
| 15* | 625.332 | 4.12 | 1.77250 | 49.5 |
| 16 | −56.842 | 2.64 | | |
| 17 | 46.285 | 3.75 | 2.00100 | 29.1 |
| 18 | 168.332 | 1.34 | | |
| 19 | −365.708 | 1.20 | 1.70154 | 41.2 |
| 20 | 27.525 | 5.46 | 1.91650 | 31.6 |
| 21 | 87.039 | 0.18 | | |
| 22 | 59.557 | 1.15 | 1.94594 | 18.0 |
| 23 | 27.818 | 3.83 | | |
| 24 | 176.644 | 1.20 | 1.85478 | 24.8 |
| 25 | 67.243 | 5.89 | 1.69680 | 55.5 |
| 26 | −77.318 | 8.00 | | |
| 27 | ∞ | 2.50 | 1.51633 | 64.1 |
| 28 | ∞ | 2.16 | | |
| Image Plane | ∞ | | | |

Aspherical Surface Data

Fifteenth Surface

K = 0.00000e+000 A4 = −2.77448e−006 A6 = −3.60131e−010
A8 = −1.23803e−011 A10 = 4.76619e−014 A12 = −6.88926e−017

Miscellaneous Data

| | |
|---|---|
| Focal Length | 40.14 |
| F-number | 1.13 |
| Angle of View | 20.24 |
| Overall Lens Length | 93.90 |
| BF | 2.16 |
| d16 | 2.64 |
| d28 | 2.16 |

Lens Group Data

| Group | Starting Surface | Focal Length |
|---|---|---|
| Gm | 1 | 51.46 |
| Gr | 17 | 142.77 |

Example 4

Figure 7:
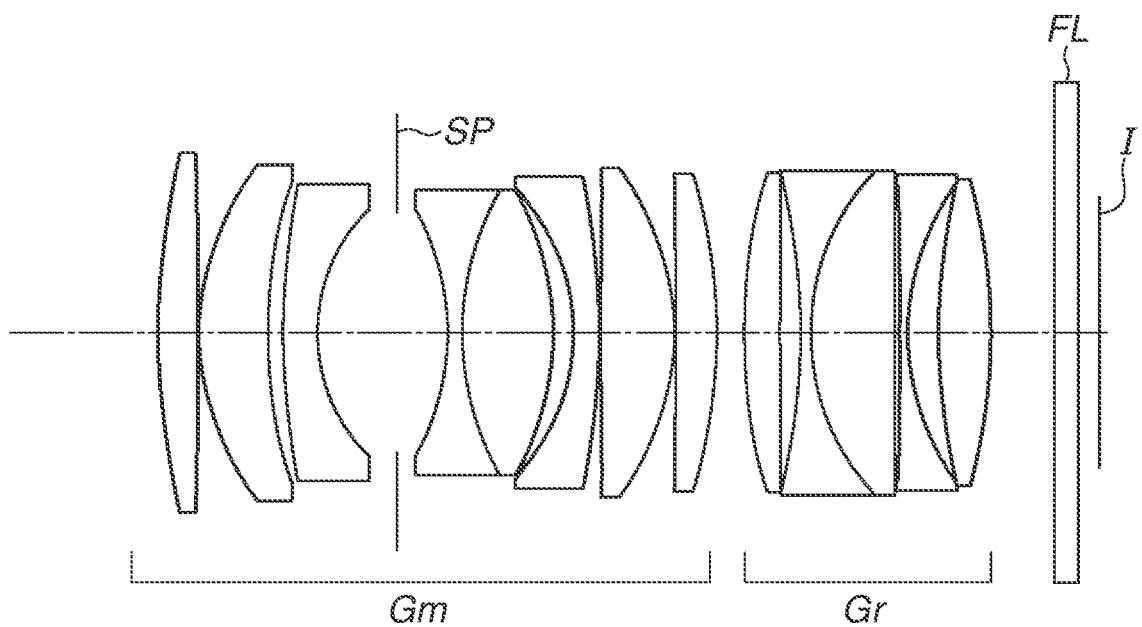
FIG. 7 is a cross-sectional view of an optical system constructed by mounting a reduction optical system according to an example 4 on the main optical system focused on infinity.
Figure 8:
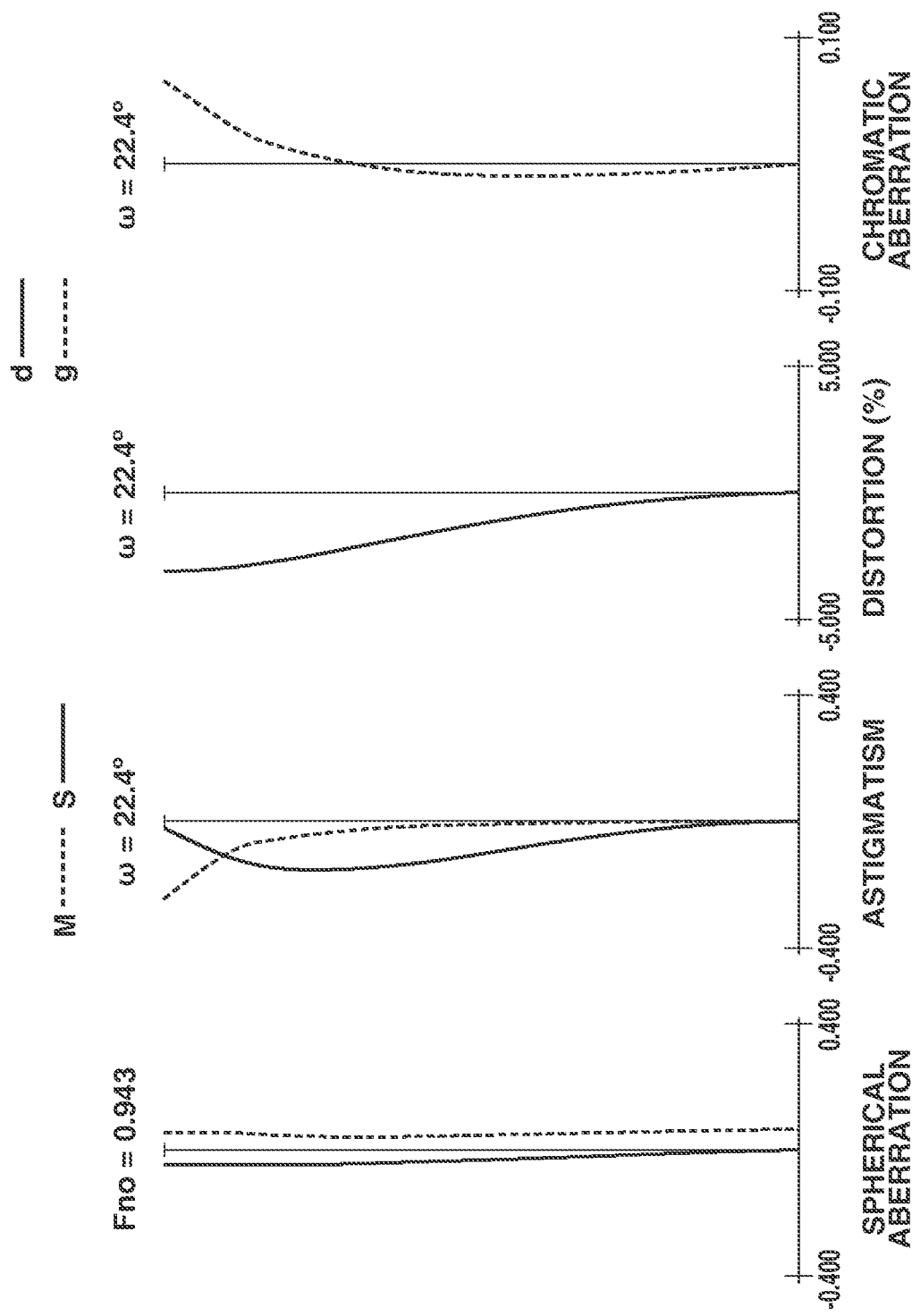
FIG. 8 illustrates longitudinal aberrations of the optical system illustrated in FIG. 7.

FIG. 7 is a cross-sectional view of an optical system constructed by mounting a reduction optical system according to the example 4 (corresponding to the numerical example 4) on the main optical system focused on infinity. FIG. 8 illustrates longitudinal aberrations of the optical system illustrated in FIG. 7.

The reduction optical system Gr according to the present example includes five lenses, i.e., the positive lens Gp11, the cemented lens formed by cementing the negative lens Gn2 and the positive lens Gp12 to each other, the negative lens Gn1, and the positive lens Gp2 arranged in this order from the object side to the image side along the optical axis. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 4

| Unit mm | | | | |
|---|---|---|---|---|
| Surface Data | | | | |
| Surface Number | r | d | nd | vd |
| 1 | 80.741 | 3.92 | 1.77250 | 49.6 |
| 2 | −851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | −27.317 | 1.39 | 1.73800 | 32.3 |
| 9 | 29.595 | 8.79 | 1.88100 | 40.1 |
| 10 | −31.996 | 2.12 | | |
| 11 | −21.263 | 2.52 | 1.72047 | 34.7 |
| 12 | −82.521 | 0.15 | | |
| 13 | 723.827 | 7.10 | 1.59522 | 67.7 |
| 14 | −28.930 | 0.15 | | |
| 15* | 625.332 | 4.12 | 1.77250 | 49.5 |
| 16 | −56.842 | 2.64 | | |
| 17 | 62.121 | 3.51 | 1.90043 | 37.4 |
| 18 | −4465.572 | 2.00 | | |
| 19 | −66.735 | 0.90 | 1.59270 | 35.3 |
| 20 | 24.721 | 8.32 | 2.05090 | 26.9 |
| 21 | −7017.427 | 0.32 | | |
| 22 | −793.922 | 0.90 | 1.94594 | 18.0 |
| 23 | 26.876 | 2.90 | | |
| 24 | 62.445 | 5.25 | 1.88300 | 40.8 |
| 25 | −58.236 | 6.00 | | |
| 26 | ∞ | 2.50 | 1.51633 | 64.1 |
| 27 | ∞ | 2.08 | | |
| Image Plane | ∞ | | | |

-continued

| Unit mm |
|---|
| Aspherical Surface Data |
| Fifteenth Surface |
| K = 0.00000e+000 A4 = −2.77448e−006 A6 = −3.60131e−010 A8 = −1.23803e−011 A10 = 4.76619e−014 A12 = −6.88926e−017 |

| | |
|---|---|
| Focal Length | 33.45 |
| F-number | 0.94 |
| Angle of View | 22.42 |
| Overall Lens Length | 91.91 |
| BF | 2.08 |

| Lens Group Data | | |
|---|---|---|
| Group | Starting Surface | Focal Length |
| 1 | 1 | 51.46 |
| 2 | 17 | 54.69 |

Example 5

Figure 9:
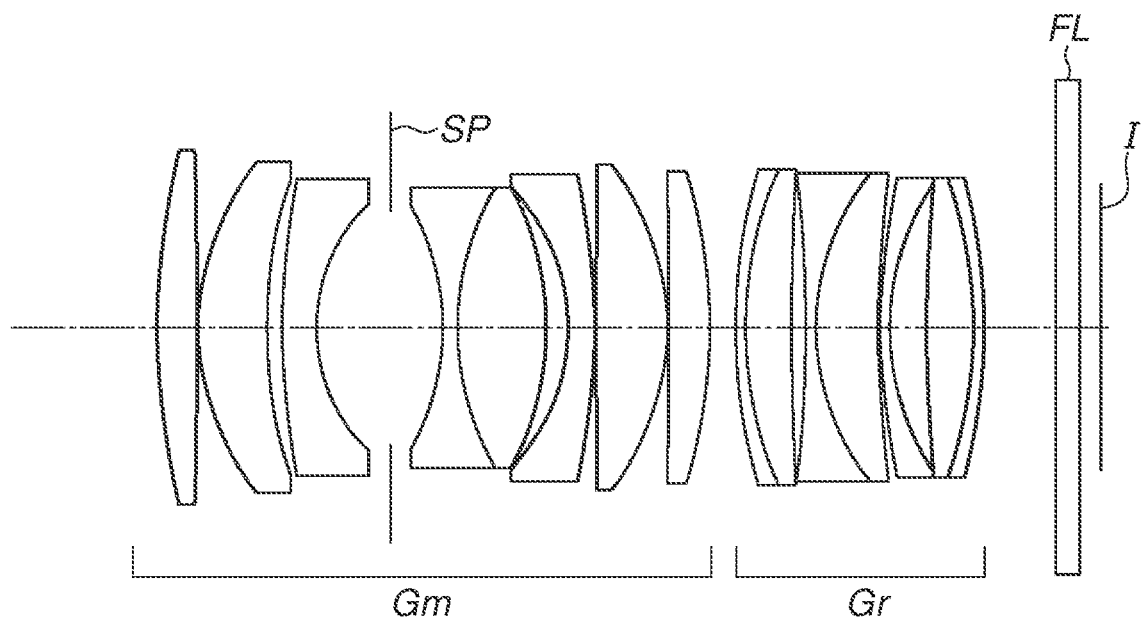
FIG. 9 is a cross-sectional view of an optical system constructed by mounting a reduction optical system according to an example 5 on the main optical system focused on infinity.
Figure 10:
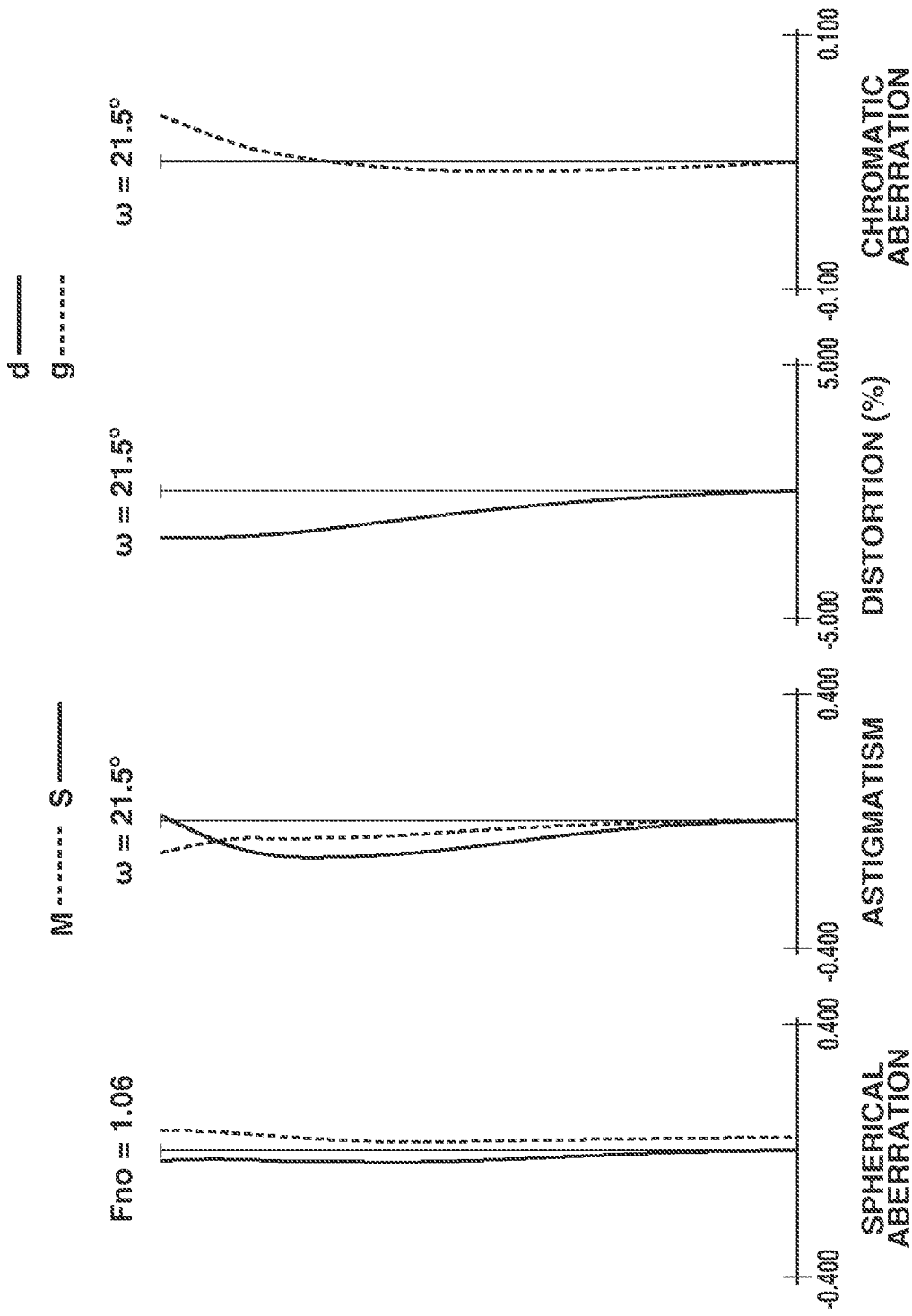
FIG. 10 illustrates longitudinal aberrations of the optical system illustrated in FIG. 9.

FIG. 9 is a cross-sectional view of an optical system constructed by mounting a reduction optical system according to the example 5 (corresponding to the numerical example 5) on the main optical system focused on infinity. FIG. 10 illustrates longitudinal aberrations of the optical system illustrated in FIG. 9. The reduction optical system Gr according to the present example includes the following lenses arranged in the listed order from the object side to the image side along the optical axis. That is, the reduction optical system Gr includes seven lenses, i.e., a cemented lens formed by cementing a negative lens and the positive lens Gp11 to each other, the cemented lens formed by cementing the negative lens Gn2 and the positive lens Gp12, the negative lens Gn1, and a cemented lens formed by cementing the positive lens Gp2 and a negative lens. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 5

Unit mm

Surface Data

| Surface Number | r | d | nd | vd |
|---|---|---|---|---|
| 1 | 80.741 | 3.92 | 1.77250 | 49.6 |
| 2 | -851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | -27.317 | 1.39 | 1.73800 | 32.3 |
| 9 | 29.595 | 8.79 | 1.88100 | 40.1 |
| 10 | -31.996 | 2.12 | | |
| 11 | -21.263 | 2.52 | 1.72047 | 34.7 |
| 12 | -82.521 | 0.15 | | |
| 13 | 723.827 | 7.10 | 1.59522 | 67.7 |
| 14 | -28.930 | 0.15 | | |
| 15* | 625.332 | 4.12 | 1.77250 | 49.5 |
| 16 | -56.842 | 2.64 | | |
| 17 | 63.198 | 1.00 | 1.48749 | 70.2 |
| 18 | 43.080 | 4.44 | 2.00100 | 29.1 |
| 19 | 253.678 | 1.53 | | |
| 20 | -138.197 | 1.00 | 1.69895 | 30.1 |
| 21 | 26.572 | 6.08 | 2.00100 | 29.1 |
| 22 | 104.760 | 0.24 | | |
| 23 | 70.696 | 1.00 | 1.94594 | 18.0 |
| 24 | 28.124 | 3.58 | | |
| 25 | 140.240 | 4.71 | 1.76385 | 48.5 |
| 26 | -46.751 | 1.00 | 1.85478 | 24.8 |
| 27 | -63.583 | 7.00 | | |
| 28 | ∞ | 2.50 | 1.51633 | 64.1 |
| 29 | ∞ | 2.10 | | |
| Image Plane | ∞ | | | |

Aspherical Surface Data

Fifteenth Surface

K = 0.00000e+000 A4 = -2.77448e-006 A6 = -3.60131e-010
A8 = -1.23803e-011 A10 = 4.76619e-014 A12 = -6.88926e-017

| Focal Length | 37.57 |
|---|---|
| F-number | 1.06 |
| Angle of View | 21.50 |
| Overall Lens Length | 93.41 |
| BF | 2.10 |

Lens Group Data

| Group | Starting Surface | Focal Length |
|---|---|---|
| Gm | 1 | 51.46 |
| Gr | 17 | 91.00 |

Example 6

Figure 11:
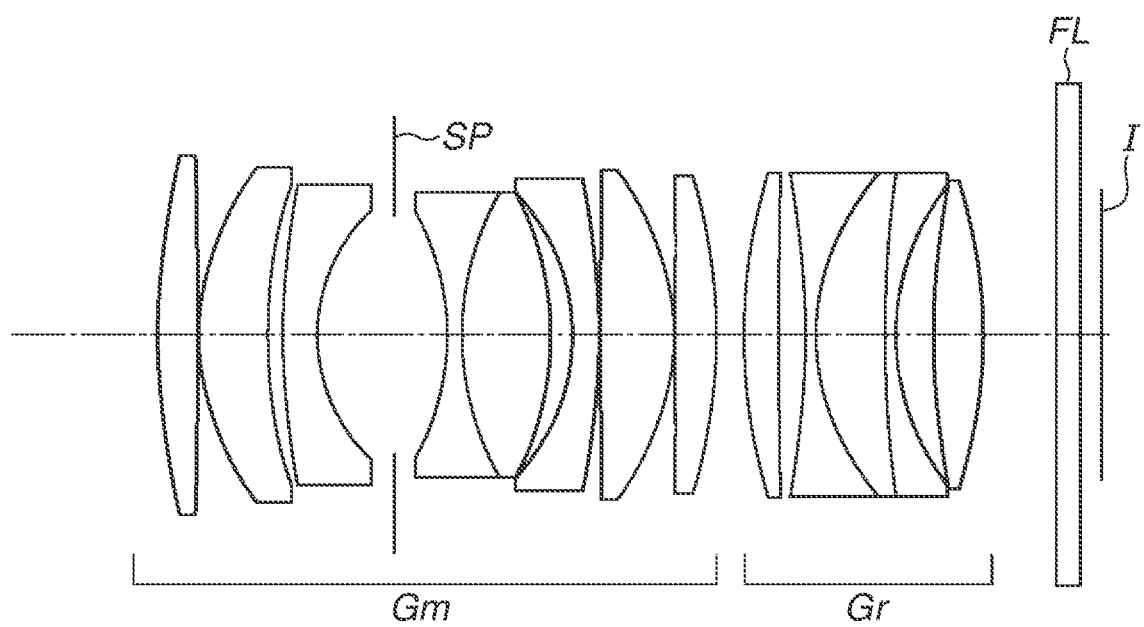
FIG. 11 is a cross-sectional view of an optical system constructed by mounting a reduction optical system according to an example 6 on the main optical system focused on infinity.
Figure 12:
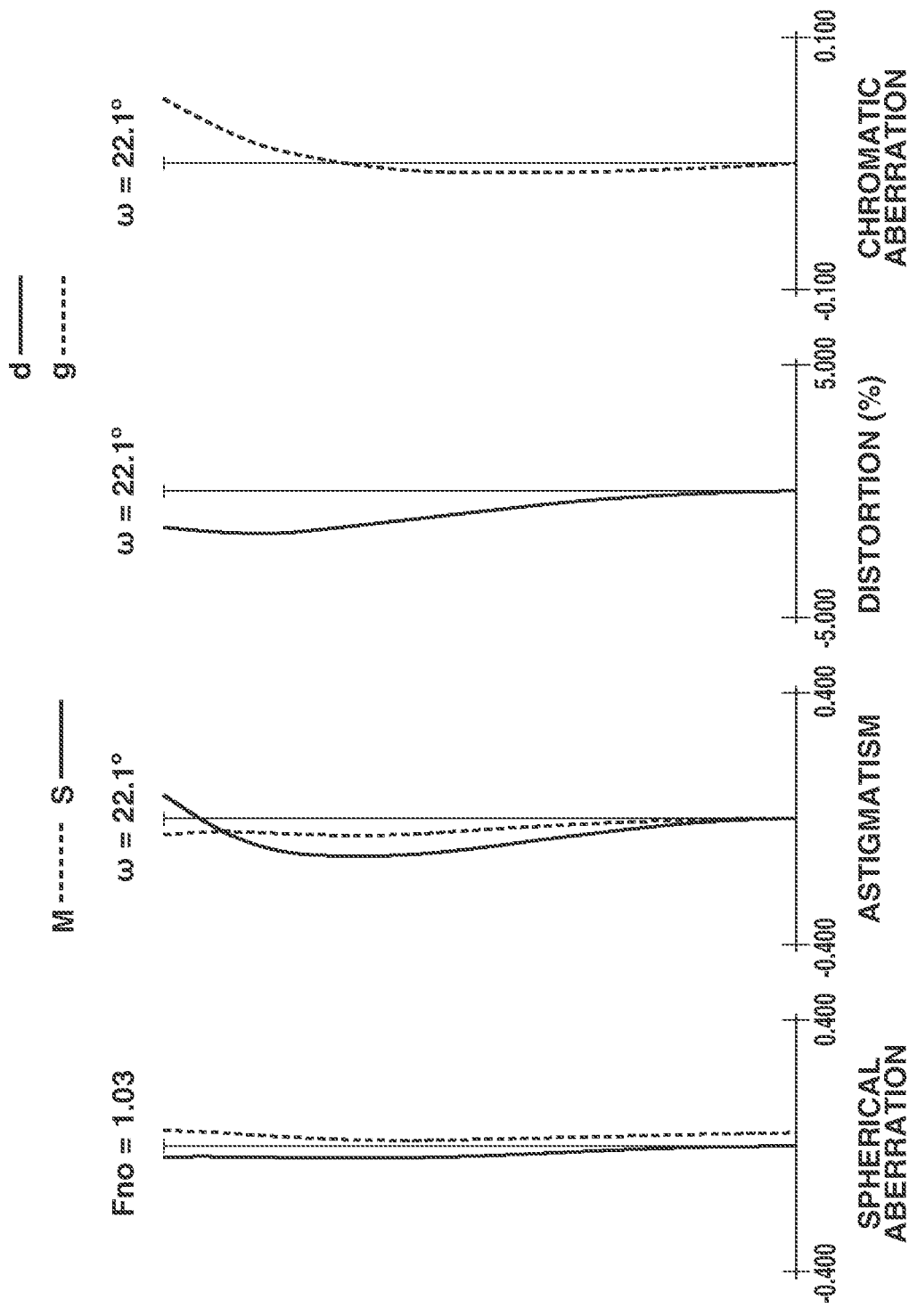
FIG. 12 illustrates longitudinal aberrations of the optical system illustrated in FIG. 11.

FIG. 11 is a cross-sectional view of an optical system constructed by mounting a reduction optical system according to the example 6 (corresponding to the numerical example 6) on the main optical system focused on infinity. FIG. 12 illustrates longitudinal aberrations of the optical system illustrated in FIG. 11. The reduction optical system Gr according to the present example includes five lenses, i.e., the positive lens Gp11, the cemented lens formed by cementing the negative lens Gn2, the positive lens Gp12, and the negative lens Gn1 to one another, and the positive lens Gp2 arranged in this order from the object side to the image side along the optical axis. In this example, the positive lens Gp11 and the positive lens Gp12 correspond to the above-described positive lens Gp1. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the spherical aberration and the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 6

Unit mm

Surface Data

| Surface Number | r | d | nd | vd |
|---|---|---|---|---|
| 1 | 80.741 | 3.92 | 1.77250 | 49.6 |
| 2 | -851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | -27.317 | 1.39 | 1.73800 | 32.3 |
| 9 | 29.595 | 8.79 | 1.88100 | 40.1 |
| 10 | -31.996 | 2.12 | | |
| 11 | -21.263 | 2.52 | 1.72047 | 34.7 |
| 12 | -82.521 | 0.15 | | |
| 13 | 723.827 | 7.10 | 1.59522 | 67.7 |
| 14 | -28.930 | 0.15 | | |
| 15* | 625.332 | 4.12 | 1.77250 | 49.5 |
| 16 | -56.842 | 2.64 | | |
| 17 | 57.454 | 3.46 | 1.90525 | 35.0 |
| 18 | 801.829 | 2.62 | | |
| 19 | -80.235 | 1.00 | 1.59270 | 35.3 |
| 20 | 25.297 | 6.78 | 2.05090 | 26.9 |
| 21 | 130.809 | 1.00 | 1.92286 | 18.9 |
| 22 | 26.170 | 3.64 | | |
| 23 | 84.911 | 4.86 | 1.72916 | 54.7 |
| 24 | -54.246 | 7.00 | | |
| 25 | ∞ | 2.50 | 1.51633 | 64.1 |
| 26 | ∞ | 2.09 | | |
| Image Plane | ∞ | | | |

Aspherical Surface Data

Fifteenth Surface

K = 0.00000e+000 A4 = -2.77448e-006 A6 = -3.60131e-010
A8 = -1.23803e-011 A10 = 4.76619e-014 A12 = -6.88926e-017

Miscellaneous Data

| Focal Length | 36.54 |
|---|---|
| F-number | 1.03 |
| Angle of View | 22.05 |

-continued

Unit mm

| | | |
|---|---|---|
| Overall Lens Length | 92.19 | |
| BF | 2.09 | |

Zoom Lens Group Data

| Group | Starting Surface | Focal Length |
|---|---|---|
| 1 | 1 | 51.46 |
| 2 | 17 | 76.35 |

Example 7

Figure 13:
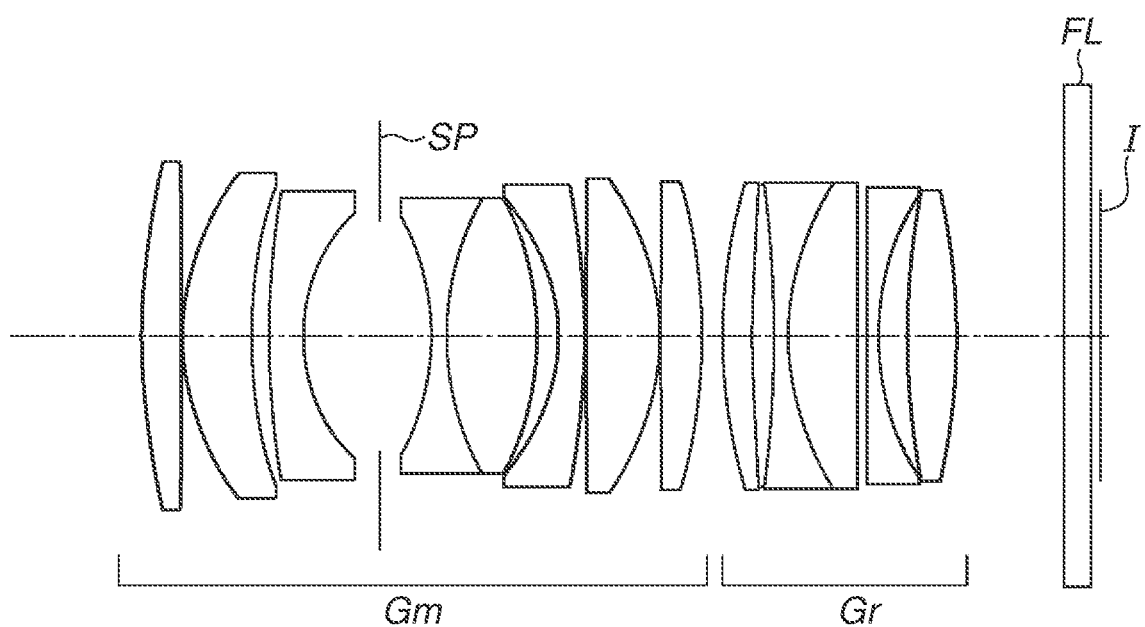
FIG. 13 is a cross-sectional view of an optical system constructed by mounting a reduction optical system according to an example 7 on the main optical system focused on infinity.
Figure 14:
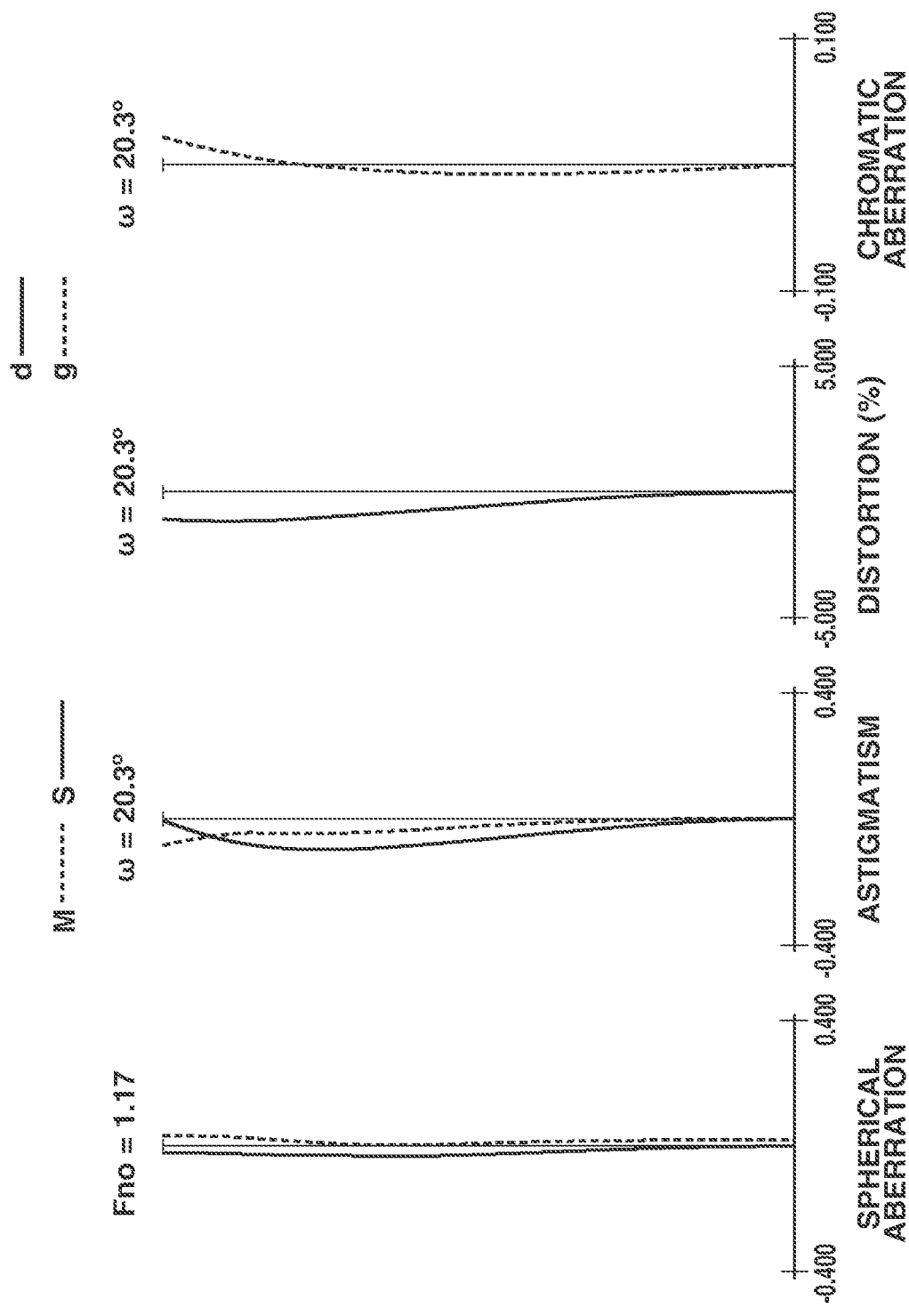
FIG. 14 illustrates longitudinal aberrations of the optical system illustrated in FIG. 13.

FIG. 13 is a cross-sectional view of an optical system constructed by mounting a reduction optical system according to the example 7 (corresponding to the numerical example 7) on the main optical system focused on infinity. FIG. 14 illustrates longitudinal aberrations of the optical system illustrated in FIG. 13. The reduction optical system Gr according to the present example includes five lenses, i.e., a positive lens, a cemented lens formed by cementing the negative lens Gn2 and the positive lens Gp1 to each other, the negative lens Gn1, and the positive lens Gp2 arranged in this order from the object side to the image side along the optical axis. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the correction of the field curvature by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 7

Unit mm

Surface Data

| Surface Number | r | d | nd | vd |
|---|---|---|---|---|
| 1 | 80.741 | 3.92 | 1.77250 | 49.6 |
| 2 | −851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |

-continued

Unit mm

| | | | | |
|---|---|---|---|---|
| 8 | −27.317 | 1.39 | 1.73800 | 32.3 |
| 9 | 29.595 | 8.79 | 1.88100 | 40.1 |
| 10 | −31.996 | 2.12 | | |
| 11 | −21.263 | 2.52 | 1.72047 | 34.7 |
| 12 | −82.521 | 0.15 | | |
| 13 | 723.827 | 7.10 | 1.59522 | 67.7 |
| 14 | −28.930 | 0.15 | | |
| 15* | 625.332 | 4.12 | 1.77250 | 49.5 |
| 16 | −56.842 | 2.00 | | |
| 17 | 58.301 | 2.83 | 1.88300 | 40.8 |
| 18 | 165.148 | 2.10 | | |
| 19 | −119.174 | 1.45 | 1.51633 | 64.1 |
| 20 | 30.119 | 6.71 | 1.90043 | 37.4 |
| 21 | −1223.055 | 0.92 | | |
| 22 | −5261.247 | 1.15 | 1.85896 | 22.7 |
| 23 | 29.490 | 2.77 | | |
| 24 | 84.265 | 4.75 | 1.61772 | 49.8 |
| 25 | −70.633 | 10.59 | | |
| 26 | ∞ | 2.50 | 1.54430 | 69.9 |
| 27 | ∞ | 1.00 | | |
| Image Plane | ∞ | | | |

Aspherical Surface Data

Fifteenth Surface

K = 0.00000e+000 A4 = −2.77448e−006 A6 = −3.60131e−010
A8 = −1.23803e−011 A10 = 4.76619e−014 A12 = −6.88926e−017

| | |
|---|---|
| Focal Length | 40.10 |
| F-number | 1.17 |
| Angle of View | 20.26 |
| Overall Lens Length | 93.36 |
| BF | 1.00 |

Lens Group Data

| Group | Starting Surface | Focal Length |
|---|---|---|
| Gm | 1 | 51.46 |
| Gr | 17 | 133.34 |

Example 8

Figure 15:
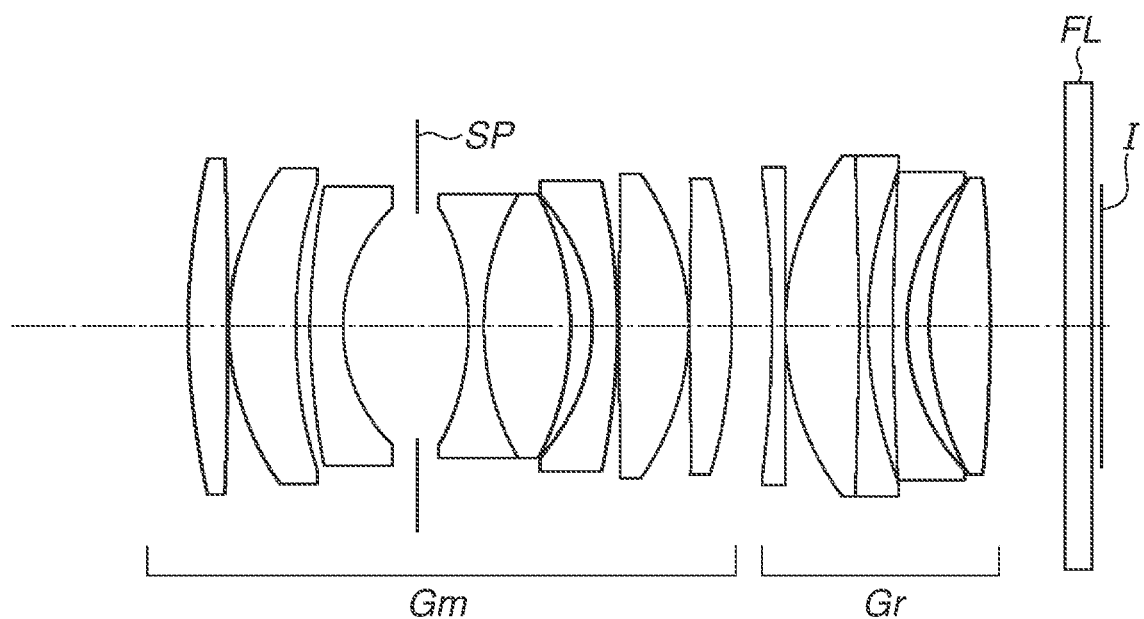
FIG. 15 is a cross-sectional view of an optical system constructed by mounting a reduction optical system according to an example 8 on the main optical system focused on infinity.
Figure 16:
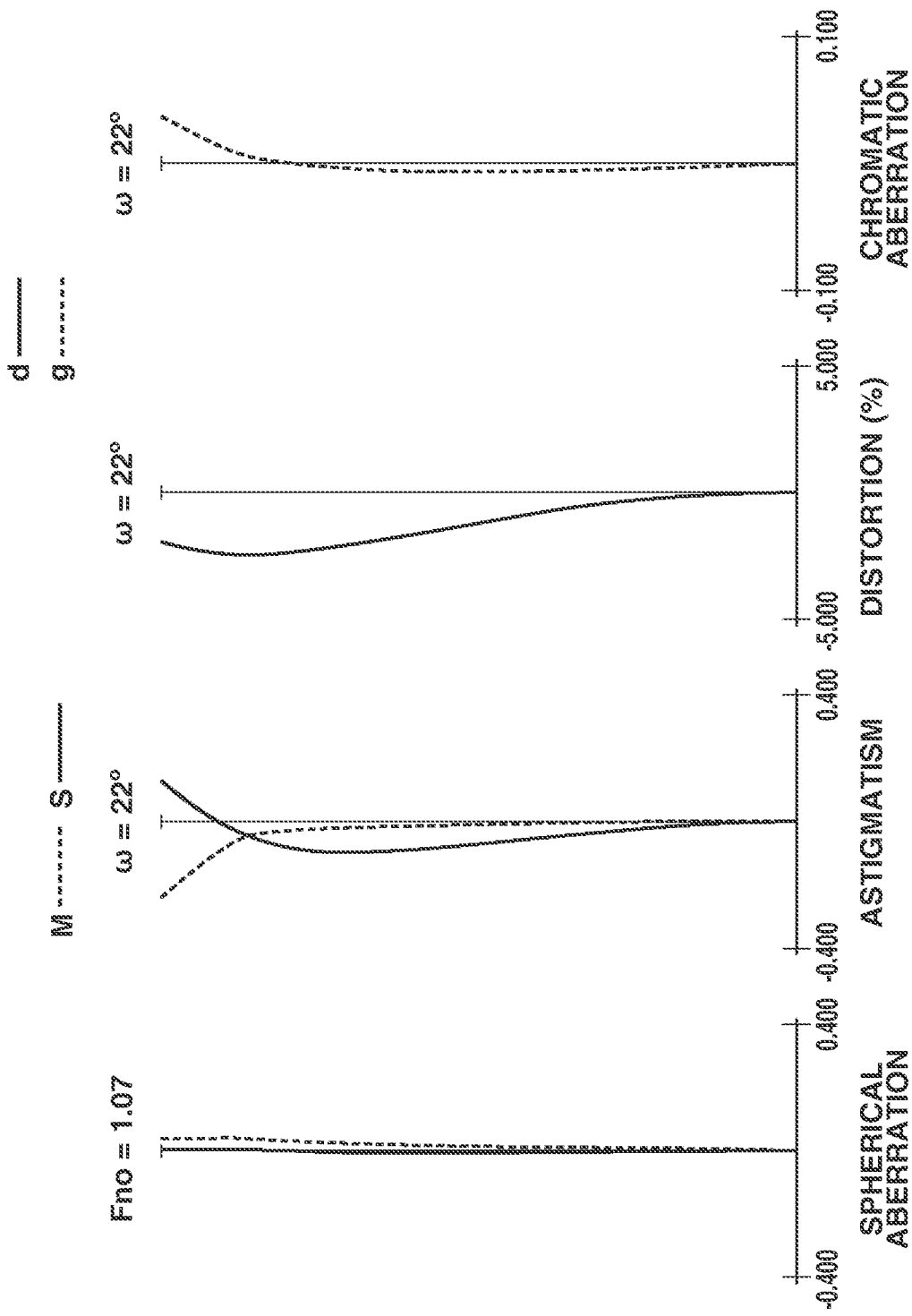
FIG. 16 illustrates longitudinal aberrations of the optical system illustrated in FIG. 15.

FIG. 15 is a cross-sectional view of an optical system constructed by mounting a reduction optical system according to the example 8 (corresponding to the numerical example 8) on the main optical system focused on infinity. FIG. 16 illustrates longitudinal aberrations of the optical system illustrated in FIG. 15. The reduction optical system Gr according to the present example includes five lenses, i.e., a negative lens, a cemented lens formed by cementing the positive lens Gp1 and the negative lens Gn2 to each other, the negative lens Gn1, and the positive lens Gp2 arranged in this order from the object side to the image side along the optical axis. The reduction optical system Gr is configured advantageously in terms of the corrections of the field curvature and the astigmatism by causing the three positive lenses to share the positive refractive power in the reduction optical system Gr among them. Further, the reduction optical system Gr is configured advantageously in terms of the corrections of the field curvature and the astigmatism by disposing the negative lens Gn2 having a strong negative refractive power. Further, the reduction optical system Gr is configured advantageously in terms of the primary correction of the chromatic aberration of magnification by disposing the negative lens Gn1 made from a highly dispersive glass material.

Values regarding the inequality (1) to the inequality (10) according to the present example are indicated in the table 1. The present example can provide a reduction optical system satisfying all the inequality (1) to the inequality (10) and advantageous in terms of the high optical performance. The reduction optical system Gr according to the present example is to satisfy the inequality (1) to the inequality (3), but the satisfaction of the inequality (4) to the inequality (10) can be optional. Further satisfying at least one of the inequality (4) to the inequality (10) can provide a reduction optical system further advantageous in terms of the high optical performance.

Numerical Example 8

Unit mm

Surface Data

| Surface Number | r | d | nd | vd |
|---|---|---|---|---|
| 1 | 80.741 | 3.92 | 1.77250 | 49.6 |
| 2 | −851.470 | 0.15 | | |
| 3 | 28.940 | 6.73 | 1.83481 | 42.7 |
| 4 | 53.453 | 1.56 | | |
| 5 | 81.904 | 3.28 | 1.72047 | 34.7 |
| 6 | 18.258 | 7.54 | | |
| 7 (Stop) | ∞ | 5.08 | | |
| 8 | −27.317 | 1.39 | 1.73800 | 32.3 |
| 9 | 29.595 | 8.79 | 1.88100 | 40.1 |
| 10 | −31.996 | 2.12 | | |
| 11 | −21.263 | 2.52 | 1.72047 | 34.7 |
| 12 | −82.521 | 0.15 | | |
| 13 | 723.827 | 7.10 | 1.59522 | 67.7 |
| 14 | −28.930 | 0.15 | | |
| 15* | 625.332 | 4.12 | 1.77250 | 49.5 |
| 16 | −56.842 | 4.00 | | |
| 17 | −142.009 | 1.20 | 1.59270 | 35.3 |
| 18 | 808.621 | 0.15 | | |
| 19 | 31.125 | 7.43 | 2.00100 | 29.1 |
| 20 | −399.042 | 1.00 | 1.58144 | 40.8 |
| 21 | 44.405 | 2.44 | | |
| 22 | 223.655 | 1.40 | 1.89286 | 20.4 |
| 23 | 23.104 | 2.21 | | |
| 24 | 32.237 | 6.07 | 1.75500 | 52.3 |
| 25 | −203.443 | 7.77 | | |
| 26 | ∞ | 2.50 | 1.54430 | 69.9 |
| 27 | ∞ | 1.00 | | |
| Image Plane | ∞ | | | |

Aspherical Surface Data

Fifteenth Surface

K = 0.00000e+000 A4 = −2.77448e−006 A6 = −3.60131e−010
A8 = −1.23803e−011 A10 = 4.76619e−014 A12 = −6.88926e−017

| | |
|---|---|
| Focal Length | 36.57 |
| F-number | 1.07 |
| Angle of View | 22.03 |
| Overall Lens Length | 91.76 |
| BF | 1.00 |
| d16 | 4.00 |
| d27 | 1.00 |

Lens Group Data

| Group | Starting Surface | Focal Length |
|---|---|---|
| Gm | 1 | 51.46 |
| Gr | 17 | 89.44 |

The lens surface forming the reduction optical system Gr according to the present exemplary embodiment may be a flat surface or an aspherical surface. In the case where this lens surface is an aspherical surface, this aspherical surface may be any aspherical surface among an aspherical surface formed by grinding processing, an aspherical surface formed by glass molding, and a compound aspherical surface formed by resin molding on a glass surface. Further, this lens surface may be a diffractive surface. Further, the lens may be a gradient-index lens (a GRIN lens) or a plastic lens. Further, this lens surface may include an antireflection film having a high transmittance with respect to a wide wavelength band. In this case, the present exemplary embodiment can reduce flaring and ghosting, thereby forming a high-contrast image.

TABLE 1

| | Numerical Example 1 | Numerical Example 2 | Numerical Example 3 | Numerical Example 4 | Numerical Example 5 | Numerical Example 6 | Numerical Example 7 | Numerical Example 8 |
|---|---|---|---|---|---|---|---|---|
| Conditional Expression (1) | 0.71 | 0.71 | 0.78 | 0.65 | 0.73 | 0.71 | 0.78 | 0.71 |
| Conditional Expression (2) | 0.80 | 0.62 | 0.44 | 1.24 | 0.56 | 0.89 | 0.25 | 0.33 |
| Conditional Expression (3) | 0.37 | 0.33 | 0.29 | 0.43 | 0.38 | 0.38 | | |
| Conditional Expression (3) | 2.001 | 1.954 | 2.001 | 1.900 | 2.001 | 1.905 | 1.900 | 2.001 |
| | 2.001 | 1.954 | 1.917 | 2.051 | 2.001 | 2.051 | | |
| Conditional Expression (4) | 17.98 | 20.36 | 17.98 | 17.98 | 17.98 | 18.90 | 22.73 | 20.36 |
| Conditional Expression (5) | 0.41 | 0.29 | 0.26 | 0.55 | 0.35 | 0.47 | 0.35 | 0.77 |
| Conditional Expression (6) | 1.620 | 1.750 | 1.702 | 1.593 | 1.699 | 1.593 | 1.516 | 1.581 |
| Conditional Expression (7) | 0.62 | 0.56 | 0.37 | 0.64 | 0.51 | 0.60 | 0.47 | 0.42 |
| Conditional Expression (8) | 55.53 | 54.68 | 55.53 | 40.76 | 48.49 | 54.68 | 49.81 | 52.32 |
| Conditional Expression (9) | 0.60 | 0.50 | 0.37 | 0.77 | 0.48 | 0.63 | 0.49 | 0.37 |
| Conditional Expression (10) | 1.900 | 1.879 | 1.871 | 1.945 | 1.922 | 1.895 | 1.800 | 1.878 |

Having described a representative exemplary embodiment of the disclosure, the disclosure is not limited to the exemplary embodiment and can be modified and changed in various manners within the range of the spirit thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-071689, filed Apr. 13, 2020, which is hereby incorporated by reference herein in its entirety.

What is claimed is:

1. A reduction optical system disposed on an image side of a main optical system, the reduction optical system comprising:
a plurality of positive lenses and a plurality of negative lenses,
wherein the reduction optical system has a positive refractive power,
wherein a composite focal length of the main optical system and the reduction optical system is shorter than a focal length of the main optical system, and
wherein the following inequalities are satisfied:

$0.50<\beta<0.78$, $0.20<fp1/f<1.30$, and $1.895<Np1<2.150$, where $\beta$ is a lateral magnification of the reduction optical system disposed on the image side of the main optical system, f is a focal length of the reduction optical system, fp1 is a focal length of a positive lens Gp1 included in the plurality of positive lenses, and Np1 is a refractive index of the positive lens Gp1.

2. The reduction optical system according to claim 1, wherein the following inequality is satisfied:

$15.00<vn1<23.00$ where vn1 is an Abbe number of a negative lens Gn1 included in the plurality of negative lenses.

3. The reduction optical system according to claim 2, wherein the following inequalities are satisfied:

$0.30<|fn2/f|<1.00$, and $1.450<Nn2<1.700$, where fn2 is a focal length of a negative lens Gn2, different from the negative lens Gn1, included in the plurality of negative lenses, and Nn2 is a refractive index of the negative lens Gn2.

4. The reduction optical system according to claim 1, wherein the following inequalities are satisfied:

$0.30<fp2/f<0.80$, and $40.00<vp2<60.00$, where fp2 is a focal length of a positive lens Gp2, different from the positive lens Gp1, included in the plurality of positive lenses, and vp2 is an Abbe number of the positive lens Gp2.

5. The reduction optical system according to claim 1, wherein the following inequality is satisfied:

$0.35<fpave/f<1.00$, where fpave is an average focal length of the plurality of positive lenses.

6. The reduction optical system according to claim 1, wherein the following inequality is satisfied:

$1.800<Npave<2.000$, where Npave is an average refractive index of the plurality of positive lenses.

7. An image pickup apparatus comprising:
a reduction optical system disposed on an image side of a main optical system; and
an image pickup element configured to pick up an image formed via the reduction optical system,
the reduction optical system including a plurality of positive lenses and a plurality of negative lenses,
wherein the reduction optical system has a positive refractive power,
wherein a composite focal length of the main optical system and the reduction optical system is shorter than a focal length of the main optical system, and
wherein the following inequalities are satisfied:

$0.50<\beta<0.78$, $0.20<fp1/f<1.30$, and $1.895<Np1<2.150$, where $\beta$ is a lateral magnification of the reduction optical system disposed on the image side of the main optical system, f is a focal length of the reduction optical system, fp1 is a focal length of a positive lens Gp1 included in the plurality of positive lenses, and Np1 is a refractive index of the positive lens Gp1.

8. The image pickup apparatus according to claim 7, wherein the following inequality is satisfied:

$15.00<vn1<23.00$ where vn1 is an Abbe number of a negative lens Gn1 included in the plurality of negative lenses.

9. The image pickup apparatus according to claim 8, wherein the following inequalities are satisfied:

$0.30<|fn2/f|<1.00$, and $1.450<Nn2<1.700$, where fn2 is a focal length of a negative lens Gn2, different from the negative lens Gn1, included in the plurality of negative lenses, and Nn2 is a refractive index of the negative lens Gn2.

10. The image pickup apparatus according to claim 7, wherein the following inequalities are satisfied:

$0.30<fp2/f<0.80$, and $40.00<vp2<60.00$, where fp2 is a focal length of a positive lens Gp2, different from the positive lens Gp1, included in the plurality of positive lenses, and vp2 is an Abbe number of the positive lens Gp2.

11. The image pickup apparatus according to claim 7, wherein the following inequality is satisfied:

$0.35<fpave/f<1.00$, where fpave is an average focal length of the plurality of positive lenses.

12. The image pickup apparatus according to claim 7, wherein the following inequality is satisfied:

1.800<Npave<2.000, where Npave is an average refractive index of the plurality of positive lenses.

13. An image pickup apparatus comprising:
a main body including a reduction optical system,
the reduction optical system including a plurality of positive lenses and a plurality of negative lenses,
wherein the reduction optical system has a positive refractive power,
wherein a composite focal length of the main optical system and the reduction optical system is shorter than a focal length of the main optical system, and
wherein the following inequalities are satisfied:

0.50<β<0.78, 0.20<fp1/f<1.30, and 1.895<Np1<2.150, where β is a lateral magnification of the reduction optical system disposed on the image side of the main optical system, f is a focal length of the reduction optical system, fp1 is a focal length of a positive lens Gp1 included in the plurality of positive lenses, and Np1 is a refractive index of the positive lens Gp1.

14. The image pickup apparatus according to claim 13, wherein the following inequality is satisfied:

15.00<vn1<23.00 where vn1 is an Abbe number of a negative lens Gn1 included in the plurality of negative lenses.

15. The image pickup apparatus according to claim 14, wherein the following inequalities are satisfied:

0.30<|fn2/f|<1.00, and 1.450<Nn2<1.700, where fn2 is a focal length of a negative lens Gn2, different from the negative lens Gn1, included in the plurality of negative lenses, and Nn2 is a refractive index of the negative lens Gn2.

16. The image pickup apparatus according to claim 13, wherein the following inequalities are satisfied:

0.30<fp2/f<0.80, and 40.00<vp2<60.00, where fp2 is a focal length of a positive lens Gp2, different from the positive lens Gp1, included in the plurality of positive lenses, and vp2 is an Abbe number of the positive lens Gp2.

17. The image pickup apparatus according to claim 13, wherein the following inequality is satisfied:

0.35<fpave/f<1.00, where fpave is an average focal length of the plurality of positive lenses.

18. The image pickup apparatus according to claim 13, wherein the following inequality is satisfied:

1.800<Npave<2.000, where Npave is an average refractive index of the plurality of positive lenses.

* * * * *